United States Patent
Jeon et al.

(10) Patent No.: US 7,283,189 B2
(45) Date of Patent: Oct. 16, 2007

(54) IN-PLANE SWITCHING LIQUID CRYSTAL DISPLAY COMPRISING COMPENSATION FILM FOR ANGULAR FIELD OF VIEW USING NEGATIVE BIAXIAL RETARDATION FILM AND (+) C-PLATE

(75) Inventors: Byoung Kun Jeon, Daejeon (KR); Sergey Belyaev, Daejeon (KR); Jeong Su Yu, Daejeon (KR); Nikolay Malimonenko, Daejeon (KR)

(73) Assignee: LG Chem Ltd., Seoul (KR)

( * ) Notice: Subject to any disclaimer, the term of this patent is extended or adjusted under 35 U.S.C. 154(b) by 318 days.

(21) Appl. No.: 11/030,312

(22) Filed: Jan. 7, 2005

(65) Prior Publication Data
US 2005/0200792 A1    Sep. 15, 2005

(30) Foreign Application Priority Data
Jan. 9, 2004    (KR) ............ 10-2004-0001569

(51) Int. Cl.
*G02F 1/1335* (2006.01)
(52) U.S. Cl. .................... 349/119; 349/118
(58) Field of Classification Search ........ 349/118, 349/119
See application file for complete search history.

(56) References Cited

U.S. PATENT DOCUMENTS 3,807,831 A    4/1974 Soref

| | | |
|---|---|---|
| 2003/0122991 A1 | 7/2003 | Itakura et al. |
| 2003/0210370 A1 | 11/2003 | Yano et al. |
| 2005/0219449 A1* | 10/2005 | Tanaka ............ 349/119 |
| 2005/0280760 A1* | 12/2005 | Lyu et al. ......... 349/119 |

FOREIGN PATENT DOCUMENTS

| JP | 2004-004642 | 1/2004 |
|---|---|---|
| KR | 100265054 B1 | 6/2000 |

OTHER PUBLICATIONS

Anderson, J.E., et al., Methods and Concerns of Compensating In-Plane Switching Liquid Crystal Displays, Japanese Journal of Applied Physics, Japan Society of Applied Physics, vol. 39, No. 11, 2000, pp. 6388-6392.
Chen, J., et al., Optimum Film Compensation Modes for TN and VA LCDs, 1998 SID Int'l Symposium, Digest of Technical Papers, vol. 29, 1998, pp. 315-318.

* cited by examiner

*Primary Examiner*—David Nelms
*Assistant Examiner*—Michael H. Caley
(74) *Attorney, Agent, or Firm*—McKenna Long & Aldridge LLP (57) ABSTRACT

The present invention relates to an in-plane switching liquid crystal display comprising a negative biaxial retardation film and a positive C-plate, as viewing-angle compensation films. By the use of such viewing-angle compensation films, the contrast characteristics at the front side and inclination angle of the in-plane switching liquid crystal display can be improved and color shift with viewing angle in the dark state can be minimized.

17 Claims, 3 Drawing Sheets

IN-PLANE SWITCHING LIQUID CRYSTAL DISPLAY COMPRISING COMPENSATION FILM FOR ANGULAR FIELD OF VIEW USING NEGATIVE BIAXIAL RETARDATION FILM AND (+) C-PLATE

FIELD OF THE INVENTION

The present invention relates to liquid crystal displays (LCDs), and more particularly, to an in-plane switching liquid crystal display (IPS-LCD) filled with liquid crystals having positive dielectric anisotropy ($\Delta\epsilon>0$) or negative dielectric anisotropy ($\Delta\epsilon<0$), the display comprising a negative biaxial retardation film and a positive C-plate, as viewing-angle compensation films for improving the viewing-angle characteristics of the display.

DESCRIPTION OF THE PRIOR ART

IPS-LCDs are disclosed in U.S. Pat. No. 3,807,831, but this patent does not disclose the use of viewing-angle compensation films. IPS-LCDs including no viewing-angle compensation films have a disadvantage in that they have a low contrast ratio due to a relatively large light leakage in the dark state at inclination angle.

SUMMARY OF THE INVENTION

It is an object of the present invention to provide an IPS-LCD, which has high-contrast characteristics and low color shift at the front side and inclination angle by minimizing light leakage in the dark state at inclination angle.

The causes of reducing the viewing-angle characteristics of IPS-LCDs are broadly classified into two classes: The first is the viewing-angle dependence of a perpendicularity between the absorption axes of two polarizers, and the second is the viewing-angle dependence of birefringent characteristics of an IPS-LCD panel.

The present inventors have recognized that a negative biaxial retardation film and a positive C-plate are required to compensate for these two causes of reducing viewing angle, and designed viewing-angle compensation films with these two kinds of the retardation compensation films in order to realize wide-viewing-angle characteristics.

Moreover, the present inventors have found that, for suitable compensation for viewing angle, the optical axis direction of the negative biaxial retardation film should be suitably determined depending on the arrangement order of the negative biaxial retardation film and the positive C-plate between polarizers and a liquid crystal cell (IPS-LCD panel). On the basis of this finding, the present invention has been completed.

The present invention provides an IPS-LCD which overcame the viewing-angle problem using the negative biaxial retardation film and the positive C-plate.

More specifically, the present invention provides an in-plane switching liquid crystal display (IPS-LCD) comprising a first polarizer, a horizontally aligned liquid crystal cell filled with liquid crystals having positive dielectric anisotropy ($\Delta\epsilon>0$) or negative dielectric anisotropy ($\Delta\epsilon<0$), and a second polarizer, the optical axis of the liquid crystals in the liquid crystal cell lying in a plane parallel to the polarizers, in which the absorption axis of the first polarizer and the absorption axis of the second polarizer are perpendicular to each other, the optical axis of the liquid crystals in the liquid crystal cell is parallel to the absorption axis of the adjacent first polarizer, for viewing-angle compensation at least one negative biaxial retardation film ($n_x>n_y>n_z$) and at least one positive C-plate ($n_x=n_y<n_z$) are arranged between the polarizers and the liquid crystal cell, in which the optical axis of the negative biaxial retardation film is arranged perpendicularly to (a) the absorption axis of the polarizer just adjacent to the negative biaxial retardation film, or (b) the absorption axis of the polarizer adjacent to the liquid crystal cell when the negative biaxial retardation film is adjacent to the liquid crystal cell.

Contrast ratio value is the index of image sharpness, and the higher the contrast ratio value, the more sharp images can be realized. IPS-LCDs have the most inferior contrast characteristic at an inclination angle of 70°, and an improvement in the contrast characteristic at an inclination angle of 70° means an improvement in the contrast characteristics at all viewing-angles. The minimum contrast ratio at an inclination angle of 70° is less than 10:1 in the use of only polarizers, and can reach at least 20:1 when the positive C-plate and the negative biaxial retardation film are used according to the present invention. The minimum contrast ratio at an inclination angle of 70° is preferably more than 20:1.

DETAILED DESCRIPTION OF THE PREFERRED EMBODIMENTS

Hereinafter, the present invention will be described in detail.

Figure 1:
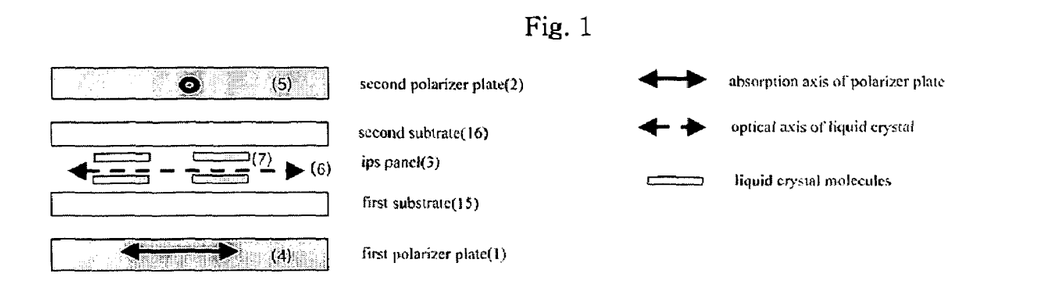
FIG. 1 shows the fundamental structure of IPS-LCDs.

FIG. 1 shows the fundamental structure of IPS-LCDs.

Figure 2:
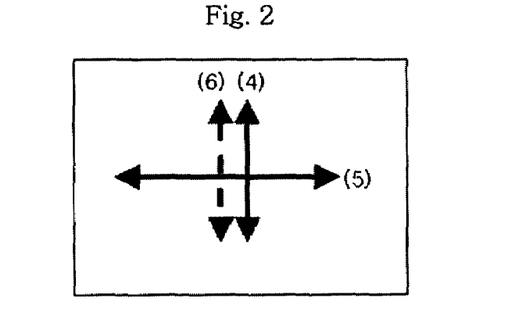
FIG. 2 shows the arrangement of the absorption axes of polarizers and the optical axis of liquid crystals of an IPS-LCD panel in the fundamental structure of FIG. 1.

As shown in FIG. 1, an IPS-LCD comprises the first polarizer 1, the second polarizer 2 and the liquid crystal cell 3. The absorption axis 4 of the first polarizer and the absorption axis 5 of the second polarizer are arranged perpendicularly to each other, and the absorption axis 4 of the first polarizer and the optical axis of the liquid crystal cell are arranged parallel to each other. FIG. 2 shows the absorption axes 4, 5 of the two polarizers and the optical axis 6 of the liquid crystal cell.

The liquid crystal display including the compensation films according to the present invention comprises the first polarizer 1, a horizontally aligned liquid crystal cell 3 having liquid crystals with positive dielectric anisotropy (Δε>0) or negative dielectric anisotropy (Δε<0) filled between two sheets of glass substrates, and the second polarizer 2, in which the optical axis 6 of the liquid crystals in the liquid crystal cell lies in a plane parallel to the polarizers. In this IPS-LCD device, the absorption axis of the first polarizer and the absorption axis of the second polarizer are perpendicular to each other, and the optical axis 6 of the liquid crystals in the liquid crystal cell is parallel to the absorption axis 4 of the adjacent first polarizer. Also, one of the first substrate 15 and the second substrate 16 has an active matrix drive electrode comprising an electrode pair, which is formed on a surface adjacent to the liquid crystal layer.

The retardation value of the liquid crystal cell (IPS-LCD panel) in the inventive IPS-LCD preferably ranges from 200 nm to 350 nm at a wavelength of 550 nm.

This is because the retardation value of the IPS-LCD panel must be half of a wavelength of 589 nm (the brightest monochromatic light felt by people) such that the light linearly polarized to 90° through the first polarizer is linearly polarized to 0° through the liquid crystal layer upon the application of voltage to the IPS-LCD panel, thus becoming the bright state. Also, to make the light white, the retardation value of the IPS-LCD panel may be slightly longer or shorter than the half-wavelength, depending on the wavelength dispersion characteristics of the used liquid crystals. For this reason, the retardation value is preferably about 295 nm which is the half-wavelength of 598 nm monochromatic light.

The inventive LCDs include one where liquid crystals are either aligned in multi-domains or divided into multi-domains by applied voltage.

LCDs are classified according to the mode of active matrix derive electrodes into in-plane-switching (IPS), super-in-plane-switching (Super-IPS), and fringe-field-switching (FFS) LCDs. In the specification, if the term "IPS-LCD" is used, it will be construed to include super-IPS, FFS (fringe field switching), reverse TN IPS LCDs, etc.

The present invention is characterized by using the positive C-plate and the negative biaxial retardation film in combination for the viewing-angle compensation of IPS-LCDs. If the positive C-plate and the negative biaxial retardation film are used in combination for the viewing-angle compensation of IPS-LCDS, it will be possible to realize wide-viewing-angle characteristics.

The total sum of the thickness-direction retardation values of the positive C-plate and the adjacent negative biaxial retardation film is positive value, and the in-plane retardation value of the biaxial retardation film functions as an A-plate. Thus, light leakage generated in the polarizers and the IPS-LCD panel can be minimized.

Figure 3:
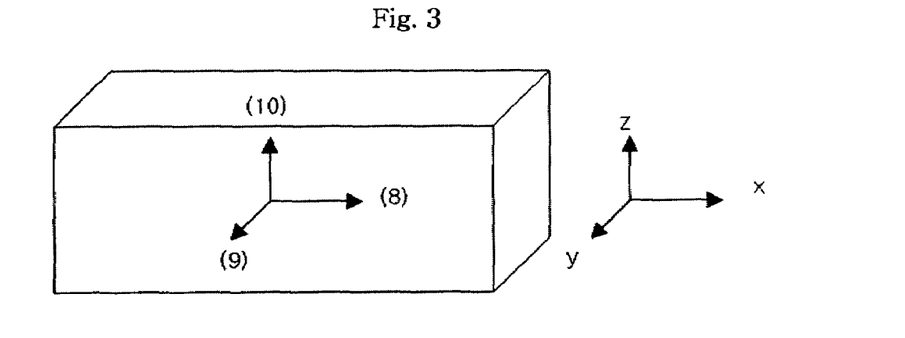
FIG. 3 shows the refractive index of a retardation film.

The refractive index of the retardation films used for the viewing-angle compensation of IPS-LCDs will now be described with reference to FIG. 3. As shown in FIG. 3, among in-plane refractive indexes, the refractive index in the x-axis direction may be referred to as $n_x$ 8, the refractive index in the y-axis direction as $n_y$ 9, and the refractive index in the thickness direction (i.e., the z-axis direction) as $n_z$ 10.

Depending on the magnitudes of the refractive indexes, the characteristics of the retardation films will be determined.

A film where the refractive indexes in the two-axis directions among the refractive indexes in the three-axis directions are different from each other is referred to as an uniaxial film. The uniaxial film can be defined as follows.

(1) A film with $n_x > n_y = n_z$ is referred to as a positive A-plate, the in-plane retardation value of which is defined using the difference between two refractive indexes lying in a plane, and the thickness of the film as given in the following equation 1.

$R_{in} = d \times (n_x - n_y)$ wherein d represents the thickness of the film. (Equation 1)

(2) A film with $n_x = n_y < n_z$ is referred to as a positive C-plate, the thickness-direction retardation value of which is defined using the difference between the in-plane refractive index and the thickness-direction refractive index, and the thickness of the film as given in the following equation.

$R_{th} = d \times (n_z - n_y)$ wherein d represents the thickness of the film. (Equation 2)

The positive C-plate is a film whose in-plane retardation value is almost zero and thickness-direction retardation is positive value.

The thickness-direction retardation value of the positive C-plate which is used for the viewing-angle compensation of IPS-LCDs preferably ranges from 50 nm to 500 nm at a wavelength of 550 nm.

A positive thickness-direction retardation value is required to minimize the light transmitted in the dark state of the polarizers. However, if a negative biaxial retardation film is used, there will be no positive thickness-direction retardation value. Thus, the positive C-plate needs to be used either to reduce the negative thickness-direction retardation value or to make it positive. The range of thickness-direction retardation value allowing the viewing-angle compensation of the polarizers and the IPS-LCD panel is 50 nm to 500 nm, and this range is required either to reduce the negative thickness-direction retardation value or to make it positive.

The wavelength dispersion characteristics of films may have normal wavelength dispersion, flat wavelength dispersion, or reverse wavelength dispersion.

A film whose refractive indexes in the three-axis directions are different from each other is referred to as a biaxial retardation film which is defined as follows.

Of in-plane refractive indexes, the refractive index in the x-axis direction is referred to as $n_x$ 8, the refractive index in the y-axis direction as $n_y$ 9, and the refractive index in the thickness direction as $n_z$ 10. A film with $n_x > n_y > n_z$ is referred to as a negative biaxial retardation film. The negative biaxial retardation film has both in-plane retardation value ($R_{in, biaxial}$) and thickness-direction retardation value ($R_{th, biaxial}$), which are defined as follows:

$R_{in, biaxial} = d \times (n_x - n_y)$ $R_{th, biaxial} = d \times (n_z - n_y)$ wherein d represents the thickness of the film.

For the viewing-angle compensation of IPS-LCDs, the negative biaxial retardation film preferably has an in-plane retardation value ranging from 20 nm to 200 nm at a wavelength of 550 nm, and a negative thickness-direction retardation value ranging from −50 nm to −300 nm at a wavelength of 550 nm.

The wavelength dispersion characteristics of the film may have normal wavelength dispersion, flat wavelength dispersion and reverse wavelength dispersion.

The structures of the viewing-angle compensation films including the positive C-plate and the negative biaxial retardation film are shown in shown in FIGS. 4, 5, 6 and 7.

The optical axis of the liquid crystal molecules 7 in the liquid crystal cell 3 sandwiched between the two crossed polarizers is arranged parallel to the IPS-LCD panel substrate, and is aligned in the rubbing direction. An IPS-LCD where the absorption axis 4 of the first polarizer adjacent to a backlight is parallel to the rubbing direction 6 is referred to as an O-mode IPS-LCD, and an IPS-LCD where the absorption axis of the polarizer adjacent to the backlight is perpendicular to the rubbing direction 6 is referred to as an E-mode IPS-LCD. The first polarizer 1 adjacent to the backlight is referred to as a lower polarizer, and the second polarizer 2 arranged away from the backlight is referred to as an upper polarizer. Absorption axes of the two polarizers are so arranged as to be crossed with each other.

In order to function to compensate for viewing angle, the two kinds of the retardation films need to be placed between the IPS-LCD panel 3 and the polarizers.

The slow axis or optical axis 13 of the retardation films may be arranged perpendicularly or in parallel to the absorption axis 5 of the polarizer adjacent thereto. The direction of the optical axis of the retardation films is determined depending on the arrangement order of the retardation films.

In order to use the A-plate for the viewing-angle compensation of the polarizers, the optical axis of the A-plate should be so arranged as to coincide with the transmission axis of the polarizer. If the positive C-plate is adjacent to the polarizer, the optical axis of the A-plate should be perpendicular with the absorption axis of the polarizer placed away from the A-plate, and if the A plate is adjacent to the polarizer, it should be perpendicular to the polarizer adjacent thereto.

Meanwhile, among the two kinds of the retardation films which are used for the viewing-angle compensation of IPS-LCDs, the first retardation film is referred to as the negative biaxial retardation film 12, and the second retardation film is referred to as the positive C-plate 11. When the two kinds of the retardation films are stacked on each other, the absolute value of the thickness-direction retardation of the second retardation film is preferably larger than that of the first retardation film as given in the following relation:

$$(R_{th})_{positive\ C\text{-}plate} > |R_{biaxial}|$$

This is because it is preferred that the total sum of the thickness-direction retardation values of the compensation films is positive value in order to improve the viewing-angle characteristics of IPS-LCDs. The above condition means that the total sum of the thickness-direction retardation values of the compensation films should be positive value.

A first embodiment of the present invention provides an IPS-LCD device, in which the negative biaxial retardation film 12 and the positive C-plate 11 are arranged between the liquid crystal cell 3 and the second polarizer 2, the positive C-plate is arranged between the negative biaxial retardation film 12 and the liquid crystal cell 3, and the optical axis 13 of the negative biaxial retardation film is perpendicular to the absorption axis 5 of the adjacent second polarizer 13.

The minimization of light leakage by the crossed polarizers is possible only when the optical axis of the A-plate and the transmission axis of the adjacent polarizer coincide with each other. Since the absorption axis of the polarizers makes a right angle with the transmission axis, the optical axis of the negative biaxial retardation film and the absorption axis of the adjacent second polarizer should make a right angle with respect to each other.

In this embodiment, the positive C-plate preferably has a thickness-direction retardation value ranging from 50 nm to 500 nm at a wavelength of 550 nm.

The thickness-direction retardation value of negative biaxial retardation films which can be fabricated at the present time ranges from −50 nm to −300 nm. Thus, the positive C-plate is needed for the total sum of the thickness-direction retardation values to have positive value, because it is preferred for the viewing-angle compensation of IPS-LCDs that the total sum of the thickness-direction retardation values ranges from +50 nm to +300 nm.

Moreover, the in-plane retardation value of the negative biaxial retardation film required for the viewing-angle compensation of IPS-LCDs is preferably less than 150 nm.

The first structure of IPS-LCD shown in FIG. 4, which has the compensation films, will be described as follows.

Figure 4:
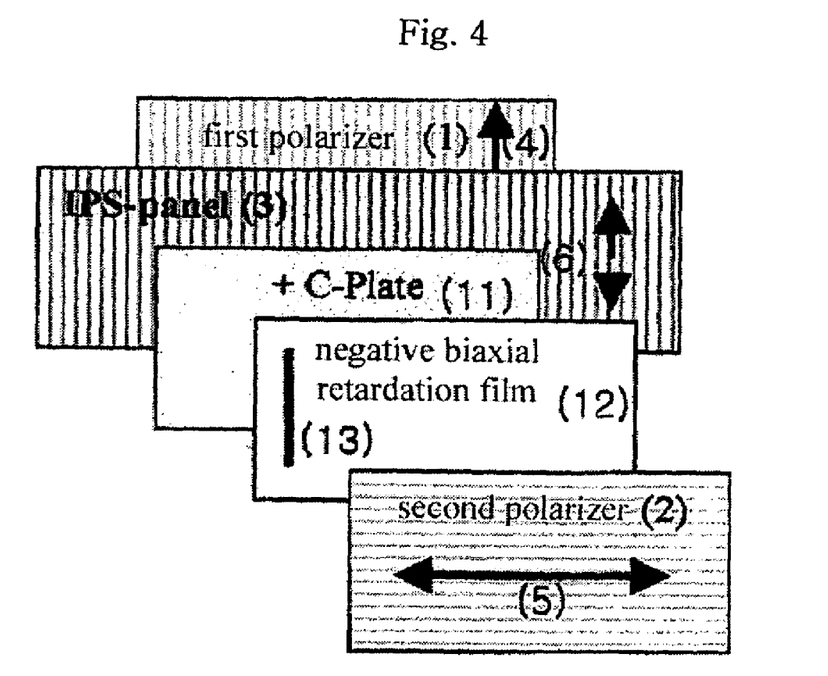
FIG. 4 shows the first structure of the inventive IPS-LCD comprising viewing-angle compensation films.

As shown in FIG. 4, the negative biaxial retardation film and the positive C-plate are arranged between the second polarizer 2 and the liquid crystal cell 3 in such a way that the negative biaxial retardation film is adjacent to the second polarizer 2. The optical axis 13 of the negative biaxial retardation film is so arranged as to be perpendicular to the absorption axis 5 of the second polarizer.

A backlight should be arranged adjacent to the first polarizer, and if the backlight is arranged adjacent to the second polarizer, the viewing-angle compensation characteristics will vary.

Simulations on this arrangement were performed while applying the actual design values of retardation films, and the results are shown in Table 1 below.

TABLE 1

| Internal protective film for first polarizer | IPS-LCD panel | Retardation value of positive C-plate | Negative biaxial film | | Internal protective film of second polarizer | Minimum contrast ratio at inclination angle of 70° |
|---|---|---|---|---|---|---|
| | | | $R_{in}$ (nm) | $R_{th}$ (nm) | | |
| COP | 290 nm | 300 | 67 | −226 | COP | 65 |
| | | 249 | 69 | −178 | | 88 |
| | | 200 | 75 | −145 | | 107 |

TABLE 1-continued

| Internal protective film for first polarizer | IPS-LCD panel | Retardation value of positive C-plate | Negative biaxial film $R_{in}$ (nm) | Negative biaxial film $R_{th}$ (nm) | Internal protective film of second polarizer | Minimum contrast ratio at inclination angle of 70° |
|---|---|---|---|---|---|---|
|  |  | 133 | 110 | −48 |  | 150 |
|  |  | 108 | 139 | −8 |  | 143 |
| 80-μm TAC |  | 315 | 40 | −320 | COP | 25 |
|  |  | 160 | 60 | −160 |  | 27 |
|  |  | 120 | 66 | −128 |  | 30 |
| COP |  | 133 | 110 | −48 | TAC | 150 |
| COP |  | 153 | 66 | −33 | 80 μm TAC | 125 |
| COP |  | 226 | 42 | −15 | PNB $R_{th}$ = 160 nm | 75 |

The viewing-angle characteristics of the IPS-LCD are determined depending on how the internal protective films for the polarizers, and the retardation values of the positive C-plate and the negative biaxial retardation film, are designed.

Table 1 above summarizes the results of simulation for viewing-angle characteristics according to the internal protective film for the first polarizer, the retardation value of the positive C-plate, the retardation value of the negative biaxial retardation film, and the internal protective film for the second polarizer. Since IPS-LCDs show low-contrast characteristics at an inclination angle of 70°, the minimum contrast ratio at an inclination angle of 70° is an index indicating the extent of an improvement in contrast characteristics. IPS-LCDs including general polarizers, to which the viewing-angle compensation films have not been applied, have a minimum contrast ratio of less than 10:1 at an inclination angle of 70°. Accordingly, it can be found that the structures given in Table 1 all have an improvement in contrast characteristics, and among these results, the structure showing the highest contrast ratio is a structure showing the most excellent contrast characteristic.

A second embodiment of the present invention provides an IPS-LCD device, in which the negative biaxial retardation film 12 and the positive C-plate 11 are arranged between the liquid crystal cell 3 and the second polarizer 2, the negative biaxial retardation film is arranged between the positive C-plate and the liquid crystal cell, and the optical axis 13 of the negative biaxial retardation film is parallel to the absorption axis 5 of the second polarizer.

For the viewing-angle compensation of IPS-LCDs, the optical axis of the negative biaxial retardation film should be perpendicular to the absorption axis of the adjacent polarizer. However, due to the positive C-plate next to the second polarizer, the negative biaxial retardation film is influenced by the first polarizer.

Accordingly, the optical axis of the negative biaxial retardation film should be perpendicular to the absorption axis of the first polarizer and coincided with the absorption axis of the second polarizer.

Figure 5:
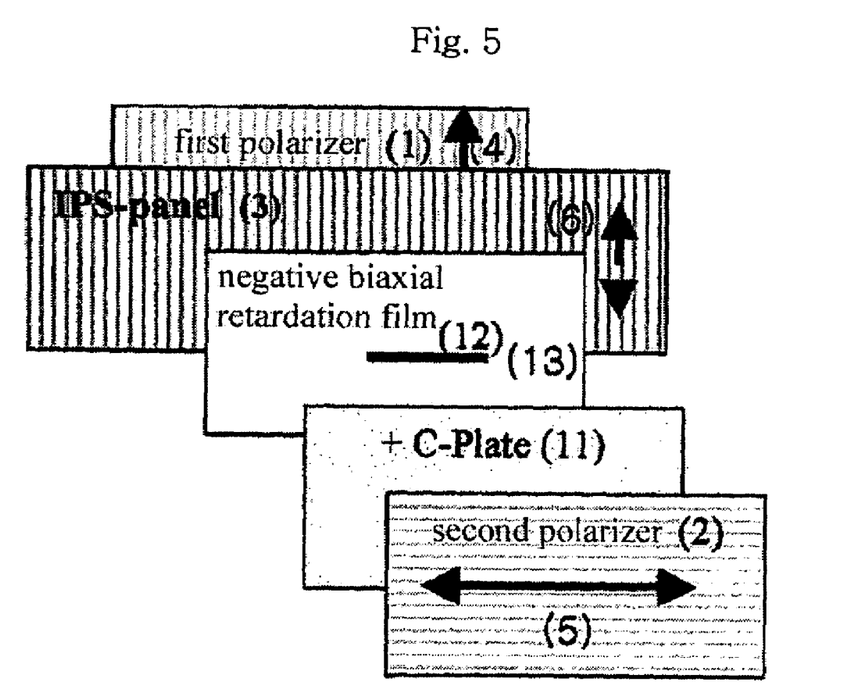
FIG. 5 shows the second structure of the inventive IPS-LCD comprising viewing-angle compensation films.

The second structure of the IPS-LCD as shown in FIG. 5, which has the compensation films, will be described as follows.

As shown in FIG. 5, the negative biaxial retardation film and the positive C-plate are arranged between the second polarizer 2 and the IPS-liquid crystal cell 3 in such a manner that the positive C-plate is adjacent to the second polarizer 2. The optical axis 13 of the negative biaxial retardation film is arranged parallel to the absorption axis of the second polarizer. Simulations on this arrangement were performed while applying the actual design values of the retardation films, and the results are shown in Table 2 below.

TABLE 2

| Internal protective film for first polarizer | IPS-LCD panel | Negative biaxial film $R_{in}$ (nm) | Negative biaxial film $R_{th}$ (nm) | Retardation value of positive C-plate | Internal protective film for second polarizer | Minimum contrast ratio at inclination angle of 70° |
|---|---|---|---|---|---|---|
| COP | 290 nm | 77 | −165 | 305 | 80 μm TAC | 95 |
| COP |  | 77 | −165 | 420 | PNB $R_{th}$ = 160 nm | 86 |
| 80-μm TAC |  | 90 | −162 | 390 | PNB $R_{th}$ = 160 nm | 25 |
| COP |  | 74 | −162 | 230 | COP | 100 |

Table 2 above shows the results of simulation for contrast characteristics at an inclination angle of 70° according to the retardation values of the internal protective films for the polarizers, the retardation value of the positive C-plate, and the retardation value of the negative biaxial retardation film.

IPS-LCDs show the minimum contrast ratio at an inclination angle of 70°, and IPS-LCDs having general polarizers, to which the compensation plates have not been applied, show a contrast ratio of less than 10:1 at an inclination angle of 70°. Accordingly, an improvement in contrast characteristics at an inclination angle of 70°, as shown in Table 2, means an improvement in contrast characteristics in all the viewing-angle directions.

A third embodiment of the present invention provides an IPS-LCD device, in which the negative biaxial retardation film 12 and the first positive C-plate 11 are arranged between the second polarizer 2 and the liquid crystal cell 3, the second positive C-plate 14 is arranged between the first polarizer 1 and the liquid crystal cell 3, the first positive C-plate 11 is arranged between the negative biaxial retardation film 12 and the liquid crystal cell 3, and the optical axis 13 of the negative biaxial retardation film is perpendicular to the absorption axis 5 of the adjacent second polarizer.

For the viewing-angle compensation of IPS-LCDs, the optical axis of the negative biaxial retardation film should coincide with the transmission axis of the adjacent polarizer. Since the transmission axis of the polarizer is perpendicular to the absorption axis thereof, the optical axis of the negative biaxial retardation film should be perpendicular to the absorption axis of the polarizer.

In this embodiment, the negative biaxial retardation film preferably has an in-plane retardation value ranging from 20 nm to 200 nm and a thickness-direction retardation value ranging from −50 nm to −300 nm. The total sum of the thickness-direction retardation values of the first and second positive C-plates preferably ranges from 50 nm to 500 nm.

Furthermore, the total sum of the thickness-direction retardation values of the two positive C-plates should be larger than the thickness-direction retardation value of the negative biaxial retardation film.

Figure 6:
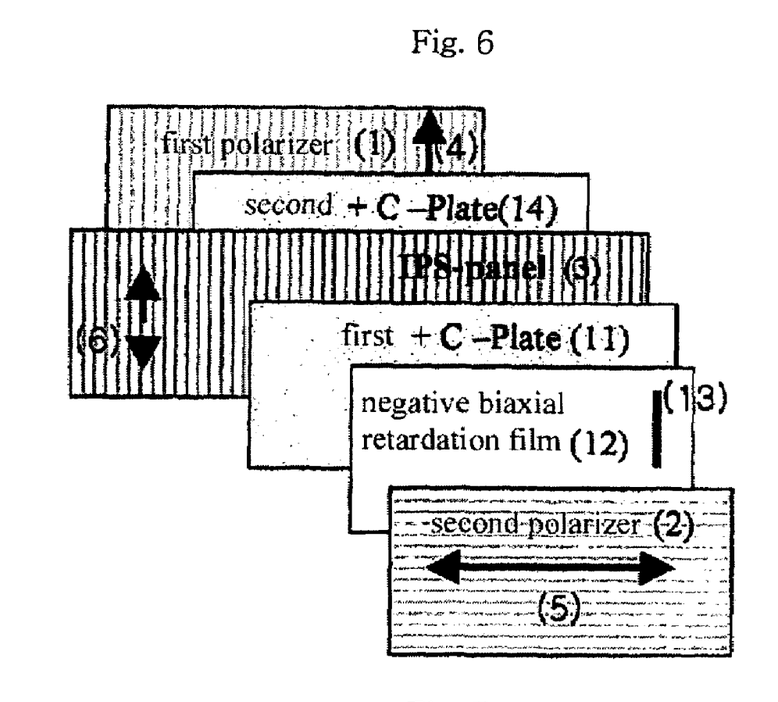
FIG. 6 shows the third structure of the inventive IPS-LCD comprising viewing-angle compensation films.

The third structure of the IPS-LCD as shown in FIG. 6, which has the compensation films, will be described as follows.

As shown in FIG. 6, the negative biaxial retardation film and the first positive C-plate 11 are arranged between the second polarizer 2 and the IPS-liquid crystal cell 3, and the negative biaxial retardation film 12 is arranged adjacent to the second polarizer 2. The optical axis 13 of the negative biaxial retardation film is arranged perpendicularly to the absorption axis 5 of the second polarizer. The second positive C-plate is arranged between the first polarizer 1 and the IPS-LCD panel 3.

Simulations on this arrangement were performed while applying the actual design values of the retardation films, and the results are shown in Table 3 below.

Table 3 above summarizes the results of simulation for the minimum contrast ratio at an inclination angle of 70° according to the retardation value of the internal protective film for the first polarizer, the retardation value of the internal protective films for the second polarizer, the retardation value of the first positive C-plate, the retardation value of the second positive C-plate, and the retardation value of the negative biaxial retardation film.

A fourth embodiment of the present invention provides an IPS-LCD device, in which the negative biaxial retardation film 12 and the first positive C-plate 11 are arranged between the second polarizer 2 and the liquid crystal cell 3, the second positive C-plate 14 is arranged between the first polarizer 1 and the liquid crystal cell 3, the first positive C-plate 11 is arranged between the negative biaxial retardation film 12 and the second polarizer 2, and the optical axis 13 of the negative biaxial retardation film is parallel to the absorption axis 5 of the second polarizer.

Figure 7:
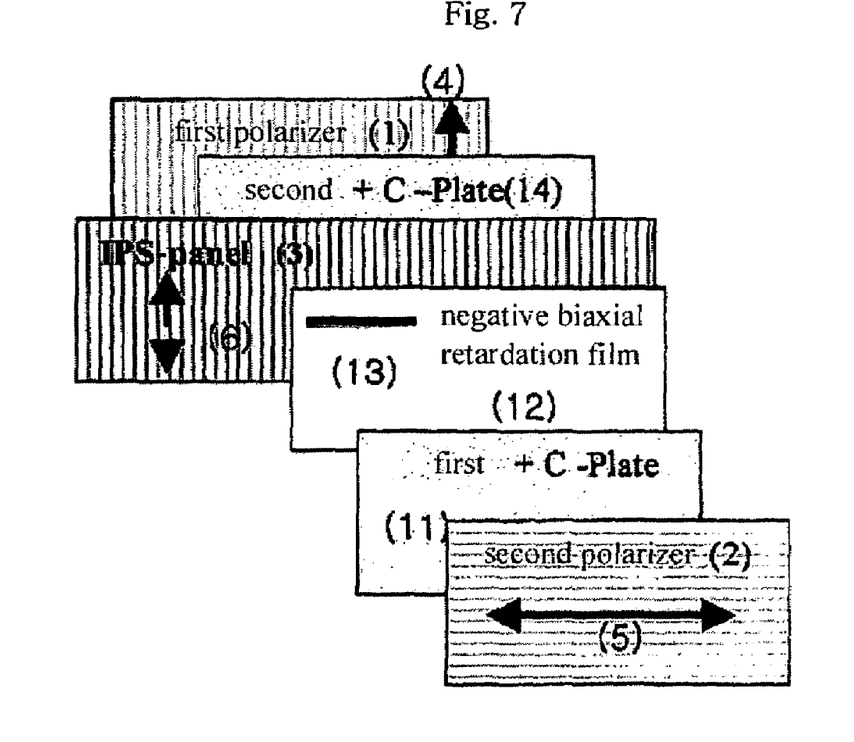
FIG. 7 shows the fourth structure of the inventive IPS-LCD structure comprising viewing-angle compensation films.

In order to improve the viewing-angle characteristics of IPS-LCDs, the optical axis of the negative biaxial retardation film should be perpendicular to the absorption axis of the adjacent polarizer. As shown in FIG. 7, since the positive C-plate is arranged between the second polarizer and the negative biaxial retardation film, the negative biaxial retardation film acts with the first polarizer, and it is needed that the optical axis of the negative biaxial retardation film coincides with the transmission axis of the first polarizer. Also, since the transmission axis of the first polarizer coincides with the absorption axis of the second polarizer, the optical axis of the negative biaxial retardation film should coincide with the absorption axis of the second polarizer.

The fourth structure of the IPS-LCD as shown in FIG. 7, which has the compensation films, will be described as follows.

The negative biaxial retardation film and the first positive C-plate are arranged between the second polarizer 2 and the IPS-liquid crystal cell 3, and the first positive C-plate is arranged adjacent to the second polarizer 2. The optical axis 13 of the negative biaxial retardation film is arranged parallel to the absorption axis 5 of the second polarizer. The second positive C-plate is arranged between the first polarizer 1 and the IPS-liquid crystal cell 3.

Simulations on this arrangement were performed while applying the actual design values of retardation films, and the results are shown in Table 4 below.

TABLE 3

| Internal protective film of first polarizer | Retardation value of second positive C-plate | IPS-LCD panel | Retardation value of first positive C-plate | Negative biaxial film | | Internal protective film of second polarizer | Minimum contrast ratio at inclination angle OF 70° |
|---|---|---|---|---|---|---|---|
| | | | | $R_{in}$ (nm) | $R_{th}$ (nm) | | |
| 80-μm TAG | 145 | 290 nm | 272 | 93 | −128 | — | 94 |
| 80-μm TAG | 110 | | 215 | 92 | −102 | COP | 136 |
| 80-μm TAG | 76 | | 235 | 77 | −160 | — | 100 |
| PNB | 220 | | 215 | 92 | −102 | COP | 125 |
| PNB | 220 | | 215 | 92 | −102 | 80-μm TAG $R_{th}$ = −65 nm | 33 |

TABLE 4

| Internal protective film for first polarizer | Retardation value of second positive C-plate | IPS-LCD panel | Negative biaxial film $R_{in}$ (nm) | $R_{th}$ (nm) | Retardation value of first positive C-plate | Internal protective film for second polarizer | Minimum contrast ratio at inclination angle of 70° |
|---|---|---|---|---|---|---|---|
| 80-μm TAC | 110 | 290 nm | 88 | −65 | 163 | COP | 150 |
| PNB $R_{th}$ = −160 nm | 220 | | 88 | −65 | 163 | COP | 140 |
| PNB $R_{th}$ = −160 nm | 220 | | 88 | −65 | 237 | 80-μm TAC | 135 |
| PNB $R_{th}$ = −160 nm | 220 | | 88 | −65 | 350 | PNB $R_{th}$ = −160 nm | 125 |

The IPS-LCDs shown in FIGS. 4 to 7 comprise the two crossed polarizers 1, 2, the liquid cell 3, and at least one positive C-plate 11 and at least one negative biaxial retardation film 12 arranged between the second polarizer 2 and the liquid crystal cell 3.

The diagonal direction refers to the 45° direction with respect to the absorption axes of the polarizers, and is a direction in which the viewing-angle characteristics of IPS-LCDs in the state of the crossed polarizers are most poor. When the two kinds of the retardation films are applied as viewing-angle compensation films for IPS-LCDs according to the present invention, the viewing-angle characteristics in the diagonal direction will be improved.

In the present invention, the polarizers may have internal and external protective films.

In order to protect a polarizing element made of stretched polyvinyl alcohol (PVA), the polarizers may comprise, as an internal protective film, triacetate cellulose (TAC) with thickness-direction retardation value, polynorbornene (PNB) or unstreched cyclo-olefin (COP) with no thickness-direction retardation value.

The viewing-angle compensation characteristics of IPS-LCDS are influenced by the protective film which is used for the protection of the polarizing element. If a protective film having thickness-direction retardation value, such as a TAC film, there will be a problem in that the viewing-angle compensation characteristics are deteriorated. If an isotropic film, such as an unstreched cyclo-olefin (COP), is used as a protective film for the polarizers, excellent viewing-angle compensation characteristics can be secured.

As the internal protective film for the first polarizer, the second polarizer or both the two polarizers, a film having a zero or negative thickness-direction retardation value is preferably used. This is because the positive C-plate adjacent to the polarizer offsets the retardation value generated by the internal protective film for the polarizer.

Meanwhile, the internal protective films for the first polarizer 1 and the second polarizer 2 is preferably made of a material selected from the group consisting of unstretched COP, 40-μm TAC, 80 μm-TAC, and PNB.

Examples of a film which can be used as the negative biaxial retardation film 12 include uniaxially stretched TAC, uniaxially stretched polynorborene (PNB), and biaxially stretched polycarbonate films. The positive C-plate 11 as the second retardation film may be made of a polymer material or an UV curable liquid crystal film, and examples thereof include a homeotropically aligned liquid crystal film, a biaxially stretched polycarbonate film, and the like.

In the present invention, the negative biaxial retardation film 12 can serve as an internal protective film for the polarizers. Since the purpose of the internal protective film for the polarizers is to protect the polarizing element, any transparent material having a function to protect the polarizers may be used as the protective material. Since the negative biaxial retardation film is made of a transparent material having a function to protect the polarizers, it can serve as a retardation film having a function to protect the polarizers.

Moreover, in the present invention, the positive C-plate 11 can serve as a protective film for the polarizers. Since the positive C-plate is made of a transparent material having a function to protect the polarizers, it can serve as a retardation film having a function to protect the polarizers.

A material which is most widely used as a protective film for general polarizers is TAC. Since TAC has negative thickness-direction retardation value, the direct use of the negative biaxial retardation film as a protective film for the polarizers has the effect of reducing the negative thickness-direction retardation value. This allows viewing-angle compensation with a small thickness-direction retardation value of the positive C-plate (see Table 1).

If the internal protective film for the polarizers has negative thickness-direction retardation value, a positive C-plate having a large retardation value should be used to make the total sum of thickness-direction retardation values larger than zero. If the thickness-direction retardation value of the internal protective film for the polarizers is zero or negative, a positive C-plate having a small retardation value may be used to improve viewing-angle characteristics.

EMBODIMENTS

Embodiment 1

The IPS-LCD shown in Table 1 above comprises the IPS liquid crystal cell which has a cell gap of 2.9 μm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 110 nm and a thickness-direction retardation value ($R_{th}$) of −48 nm. The positive C-plate 11 is an UV cured, homeotropically aligned liquid crystal film and has a retardation value ($R_{th}$) of 133 nm. Two sheets of the polarizers comprise an internal protective film of COP having a retardation value of almost zero. The result of simulation for the minimum contrast ratio at an inclination angle of 70° with respect to all azimuthal angles in the case of the application of such viewing-angle compensation films is 150:1.

Embodiment 2

The IPS-LCD shown in Table 1 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 66 nm and a thickness-direction retardation value ($R_{th}$) of −128 nm. The positive C-plate 11 is an UV cured, homeotropically aligned liquid crystal film and has a retardation value ($R_{th}$) of 120 nm. An internal protective film for the first polarizer 1 is made of TAC and has a thickness-direction retardation value ($R_{th}$) of −65 nm. An internal protective film for the second polarizer 2 is a COP film having a retardation value of almost zero. The result of simulation for the minimum contrast ratio at an inclination angle of 70° with respect to all azimuthal angles in the case of the application of such viewing-angle compensation films is 30:1.

Embodiment 3

The IPS-LCD shown in Table 1 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 110 nm and a thickness-direction retardation value ($R_{th}$) of −48 nm. The positive C-plate 11 is an UV cured, homeotropically aligned liquid crystal film and has a retardation value ($R_{th}$) of 133 nm. An internal protective film for the first polarizer 1 is made of COP, and an internal protective film for the second polarizer 2 is a stretched TAC film. The result of simulation for the minimum contrast ratio at an inclination angle of 70° with respect to all azimuthal angles in the case of the application of such viewing-angle compensation films is 150:1.

Embodiment 4

The IPS-LCD shown in Table 2 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 77 nm and a thickness-direction retardation value ($R_{th}$) of −165 nm. The positive C-plate 11 is an UV cured, homeotropically aligned liquid crystal film and has a retardation value ($R_{th}$) of 305 nm. An internal protective film for the first polarizer 1 is made of COP, and an internal protective film for the second polarizer 2 is made of 80-µm TAC and has a thickness-direction retardation value ($R_{th}$) of −65 nm. The result of simulation for the minimum contrast ratio at an inclination angle of 70° with respect to all azimuthal angles in the case of the application of such viewing-angle compensation films is 95:1.

Embodiment 5

The IPS-LCD shown in Table 2 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 77 nm and a thickness-direction retardation value ($R_{th}$) of −165 nm. The first positive C-plate 11 is an UV cured, homeotropically aligned liquid crystal film and has a retardation value ($R_{th}$) of 420 nm. An internal protective film for the first polarizer 1 is made of COP, and an internal protective film for the second polarizer 2 is a PNB film having a negative thickness-direction retardation value ($R_{th}$) of −160 nm. The result of simulation for the minimum contrast ratio at an inclination angle of 70° with respect to all azimuthal angles in the case of the application of such viewing-angle compensation films is 86:1.

Embodiment 6

The IPS-LCD shown in Table 2 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 74 nm and a thickness-direction retardation value ($R_{th}$) of −162 nm. The positive C-plate 11 is an UV cured, homeotropically aligned liquid crystal film and has a retardation value ($R_{th}$) of 230 nm. An internal protective film for the first polarizer 1 is made of COP, and an internal protective film for the second polarizer 2 is made of COP. The result of simulation for the minimum contrast ratio at an inclination angle of 70° with respect to all azimuthal angles in the case of the application of such viewing-angle compensation films is 100:1.

Embodiment 7

The IPS-LCD shown in Table 3 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 92 nm and a thickness-direction retardation value ($R_{th}$) of −102 nm. The second positive C-plate 11 is an UV cured, homeotropically aligned liquid crystal film and has a retardation value ($R_{th}$) of 110 nm. The first positive C-plate 12 is an UV cured, homeotropically aligned liquid crystal film and has a retardation value ($R_{th}$) of 215 nm. An internal protective film for the first polarizer 1 is made of 80-µm TCA having a thickness-direction retardation value ($R_{th}$) of −65 nm. An internal protective film for the second polarizer 2 is made of COP. The result of simulation for the minimum contrast ratio at an inclination angle of 70° with respect to all azimuthal angles in the case of the application of such viewing-angle compensation films is 136:1.

Embodiment 8

The IPS-LCD shown in Table 3 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 92 nm and a thickness-direction retardation value ($R_{th}$) of −102 nm. The second positive C-plate 11 is an UV cured, homeotropically aligned liquid crystal film and has a retardation value ($R_{th}$) of 220 nm. The first positive C-plate 14 is an UV cured, homeotropically aligned liquid crystal film and has a retardation value ($R_{th}$) of 215 nm. An internal protective film for the first polarizer 1 is made of PNB and has a thickness-direction retardation value ($R_{th}$) of −160 nm. An internal protective film for the second polarizer 2 is made of COP. The result of simulation for the minimum contrast ratio at an inclination angle of 70° with respect to all azimuthal angles in the case of the application of such viewing-angle compensation films is 125:1.

Embodiment 9

20 The IPS-LCD shown in Table 4 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 88 nm and a thickness-direction retardation value ($R_{th}$) of −65 nm. The second positive C-plate 11 is an UV cured, homeotropically aligned liquid crystal film and has a retardation value ($R_{th}$) of 110 nm. The first positive C-plate 14 is an UV cured, homeotropically aligned liquid crystal film and has a retardation value ($R_{th}$) of 163 nm. An internal protective film for the first polarizer 1 is made of 80-µm TAC and has a thickness-direction retardation value ($R_{th}$) of −65 nm. An internal protective film for the second polarizer 2 is made of COP. The result of simulation for the minimum contrast ratio at an inclination angle of 70° with respect to all azimuthal angles in the case of the application of such viewing-angle compensation films is 150:1.

Embodiment 10

The IPS-LCD shown in Table 4 above comprises the IPS liquid crystal cell which has a cell gap of 2.9 µm and is filled with liquid crystal molecules having a pretilt angle of 3°, a dielectric anisotropy (Δε) of +7 and a birefringence (Δn) of 0.1. The negative biaxial retardation film 12 is made of a stretched TAC film and has an in-plane retardation value ($R_{in}$) of 88 nm and a thickness-direction retardation value ($R_{th}$) of −65 nm. The second positive C-plate 11 is an UV cured, homeotropically aligned liquid crystal film and has a retardation value ($R_{th}$) of 220 nm. The first positive C-plate 14 is an UV cured, homeotropically aligned liquid crystal film and has a retardation value ($R_{th}$) of 163 nm. An internal protective film for the first polarizer 1 is made of PNB and has a thickness-direction retardation value ($R_{th}$) of −160 nm. An internal protective film for the second polarizer 2 is made of COP. The result of simulation for the minimum contrast ratio at an inclination angle of 70° with respect to all azimuthal angles in the case of the application of such viewing-angle compensation films is 140:1.

INDUSTRIAL APPLICABILITY

As described above, according to the present invention, the use of the negative biaxial retardation film and the positive C-plate allows improvements in the contrast characteristics at the front side and inclination angle of in-plane switching liquid crystal displays. Also, it allows the minimization of color shift with viewing angle in the dark state.

What is claimed is:

1. An in-plane switching liquid crystal display comprising a first polarizer, a horizontally aligned liquid crystal cell filled with liquid crystals having positive dielectric anisotropy (Δε>0) or negative dielectric anisotropy (Δε<0), and a second polarizer, the optical axis of the liquid crystals in the liquid crystal cell lying in a plane parallel to the polarizers,
  in which the absorption axis of the first polarizer is perpendicular to the absorption axis of the second polarizer, the optical axis of the liquid crystals in the liquid crystal cell is parallel to the absorption axis of the adjacent first polarizer, and
  at least one negative biaxial retardation film ($n_x > n_y > n_z$ wherein $n_x$ and $n_y$ represent in-plane refractive indexes, and $n_z$ represents the thickness-direction refractive index of the film) and at least one positive C-plate ($n_x = n_y < n_z$) are arranged between the polarizers and the liquid crystal cell, in which the optical axis of the negative biaxial retardation film is arranged perpendicularly to either (a) the absorption axis of the polarizer just adjacent to the negative biaxial retardation film, or (b) the absorption axis of the polarizer adjacent to the liquid crystal cell if the negative biaxial retardation film is adjacent to the liquid crystal cell,
  the negative biaxial retardation film having negative thickness-direction retardation value ($R_{th,\ biaxial} = d \times (n_x - n_y)$ wherein d represents the thickness of the film) and positive in-plane retardation value ($R_{in,\ biaxial} = d \times (n_x - n_y)$ wherein d represents the thickness of the film), and the positive C-plate having thickness-direction retardation value ($R_{th,\ positive\ C\ plate} = d \times (n_z - n_y)$).

2. The in-plane switching liquid crystal display of claim 1, wherein the negative biaxial retardation film and the positive C-plate are arranged between the liquid crystal cell and the second polarizer, the positive C-plate is arranged between the negative biaxial retardation film and the liquid crystal cell, and the optical axis of the negative biaxial retardation film is perpendicular to the absorption axis of the second polarizer.

3. The in-plane switching liquid crystal display of claim 2, wherein the total sum of the thickness-direction retardation values of the negative biaxial retardation film and the positive C-plate ranges from +50 nm to +300 nm at a wavelength of 550 nm.

4. The in-plane switching liquid crystal display of claim 2, wherein the negative biaxial retardation film has an n-plane retardation value of less than 150 nm at a wavelength of 550 nm.

5. The in-plane switching liquid crystal display of claim 1, wherein the negative biaxial retardation film and the positive C-plate are arranged between the liquid crystal cell and the second polarizer, the negative biaxial retardation film is arranged between the positive C-plate and the liquid crystal cell, and the optical axis of the negative biaxial retardation film is parallel to the absorption axis of the second polarizer.

6. The in-plane switching liquid crystal display of claim 1, wherein the negative biaxial retardation film and the first positive C-plate are arranged between the second polarizer and the liquid crystal cell, the second positive C-plate is arranged between the first polarizer and the liquid crystal cell, the first positive C-plate is arranged between the negative biaxial retardation film and the liquid crystal cell, and the optical axis of the negative biaxial retardation film is perpendicular to the absorption axis of the adjacent second polarizer.

7. The in-plane switching liquid crystal display of claim 1, wherein the negative biaxial retardation film and the first positive C-plate are arranged between the second polarizer and the liquid crystal cell, the second positive C-plate is arranged between the first polarizer and the liquid crystal cell, the first positive C-plate is arranged between the negative biaxial retardation film and the second polarizer, and the optical axis of the negative biaxial retardation film is parallel to the absorption axis of the second polarizer.

8. The in-plane switching liquid crystal display of claim 1, wherein the liquid crystal cell has a retardation value ranging from 200 nm to 350 nm at a wavelength of 550 nm.

9. The in-plane switching liquid crystal display of claim 1, wherein the positive C-plate has a larger thickness-direction retardation value than the absolute thickness-direction retardation value of the negative biaxial retardation film (i.e., $(R_{th})_{positive\ C-plate} > |R_{th,\ biaxial}|$).

10. The in-plane switching liquid crystal display of claim 1, wherein the positive C-plate has a thickness-direction retardation value ranging from 50 nm to 500 nm at a wavelength of 550 nm.

11. The in-plane switching liquid crystal display of claim 1, wherein the negative biaxial retardation film has an in-plane retardation value ranging from 20 nm to 200 nm at a wavelength of 550 nm and a thickness-direction retardation value ranging from −50 nm to −300 nm at a wavelength of 550 nm.

12. The in-plane switching liquid crystal display of claim 1, wherein the negative biaxial retardation film is made of an uniaxially stretched triacetate cellulose (TAC), uniaxially stretched polynorbornene (PNB), biaxially stretched polycarbonate or UV curable liquid crystal film.

13. The in-plane switching liquid crystal display of claim 1, wherein the positive C-plate serves as a protective film for the polarizers.

14. The in-plane switching liquid crystal display of claim 1, wherein an internal protective film for the first polarizer, the second polarizer or both the two polarizers has zero or negative thickness-direction retardation value.

15. The in-plane switching liquid crystal display of claim 1, wherein an internal protective film for the first or second polarizer is made of a material selected from the group consisting of unstretched COP, 40 μm TAC, 80 μm TAC and PNB.

16. The in-plane switching liquid crystal display of claim 1, wherein the negative biaxial retardation film serves as an internal protective film for the polarizers.

17. The in-plane switching liquid crystal display of claim 1, wherein the positive C-plate is made of a polymer material or an UV curable liquid crystal film.

\* \* \* \* \*